United States Patent [19]

Klose

[11] 4,170,820
[45] Oct. 16, 1979

[54] APPARATUS FOR ASSEMBLING A FERRULE WITH A SLEEVE MEMBER

[75] Inventor: Karl W. Klose, Findlay, Ohio

[73] Assignee: Cooper Tire and Rubber Company, Findlay, Ohio

[21] Appl. No.: 869,278

[22] Filed: Jan. 13, 1978

[51] Int. Cl.² ............................................. B23P 19/02
[52] U.S. Cl. ...................................... 29/789; 29/235; 29/282; 29/809
[58] Field of Search ................. 29/235, 282, 467, 525, 29/707, 717, 718, 789, 790, 809, 450

[56] References Cited

U.S. PATENT DOCUMENTS

| | | | |
|---|---|---|---|
| 2,604,692 | 7/1952 | Broden | 29/790 |
| 2,698,478 | 1/1955 | Heisterkamp et al. | 29/789 |
| 3,622,039 | 11/1971 | Lindstrom | 29/809 |
| 3,665,578 | 5/1972 | Jaquette | 29/717 |
| 3,987,532 | 10/1976 | Shemtov | 29/525 |

Primary Examiner—Milton S. Mehr
Attorney, Agent, or Firm—Kemon & Estabrook

[57] ABSTRACT

The present apparatus is directed to the assembling in concentric relation of a ferrule and a sleeve member wherein one of said elements is resilient. Where the sleeve is resilient and the ferrule is a rigid metallic member the sleeve may be compressed while being forced into said ferrule. A pair of endless members arranged in spaced parallel relation to one another engage said sleeve with the ferrule positioned between said members, and said endless members move over a camming surface for forcing the sleeve onto the ferrule.

11 Claims, 5 Drawing Figures

APPARATUS FOR ASSEMBLING A FERRULE WITH A SLEEVE MEMBER

BACKGROUND OF THE INVENTION

It has been the custom to assemble a resilient annular sleeve-like member upon a tubular element, such as a ferrule, by manually forcing the resilient sleeve element over the end of the ferrule until the resilient element encloses either a portion of the ferrule or the entire ferrule. In the final assembling of such a device the ferrule is usually supported in some suitable manner and the resilient sleeve may be manually or mechanically forced over the ferrule until properly positioned.

There have also been instances wherein the resilient sleeve-like element has been pressed over the ferrule by utilizing a piston-like structure which engages the sleeve element for forcing same over the ferrule while the entire operation is subjected to an indexing operation so that an operator can first position a ferrule upon an indexing table and then manually place a sleeve over the ferrule after which it is subjected to the force of a piston for driving said sleeve onto the ferrule. The indexing table will then be moved through to the point wherein the finished or assembled item is removed and delivered to a storage bin or the like. In operations of this type the manual placing of the sleeve and ferrule upon a turntable and the actuation of a piston to effect the assembly of the elements is a slow and laborious task necessitating the continuous employment of an operator for positioning the items on the table and also the lowering and raising of a piston element to effect the final assembly of the elements all of which necessitates the continuous use of the operator's hands in so positioning the elements which involves a question of safety regarding the operator.

There have been efforts directed heretofore to the utilization of machines to effect the assembly of the resilient sleeve and ferrule from an automated standpoint.

Another manner of assembling the insert or ferrule member within the resilient sleeve has been to provide a pair of spaced hoppers or feed troughs, one of which is adapted to receive the metallic insert or ferrule member and the other one to receive the resilient sleeve. The discharge ends of said hoppers or feed troughs have reciprocating pistons associated therewith so that upon one stroke of the piston a sleeve or metallic member or ferrule is fed to an assembly area and upon the movement of the piston in the operative direction the two elements are supposed to be assembled. One of the difficulties found in a structure of this type is in the proper positioning and alignment of the respective elements prior to and during the assembly thereof. It has been noted that in such prior art devices the lack of means to insure said proper alignment has often resulted in the elements not being assembled or to be only partially assembled or to be assembled in such an irregular manner as to be defective and not acceptable for use. All of these objectionable characteristics definitely tend to enhance the cost of operation and necessitate that each and every finished product be inspected for proper assembly prior to being used.

It has also been found that in machines of the aforementioned type that the reciprocatory movement or travel of the pistons must be at an extremely high rate in order to realize any appreciable amount of production and as a result of such a high rate of operation of the pistons the assembly of the respective elements in many instances results in an incomplete assembly or an assembly which renders the product unfit for use.

Another disadvantage inherent in high speed reciprocating mechanisms are the vibration, noise and maintenance difficulties associated with their operation.

SUMMARY OF THE INVENTION

The present invention is directed to an apparatus for assembling a resilient sleeve or washer upon a metallic insert such as a ferrule or the like.

In the present invention the metallic insert or ferrule is positioned within a supply chute and the resilient sleeve or washer is also positioned within a supply chute, which chutes are arranged so that discharge ends are positioned adjacent to a rotating wheel or drum that is provided with a plurality of spaced finger elements. The finger elements in their path of travel will be directed into the metallic insert or ferrule so as to withdraw same from the lower end of its chute contemporaneous with the insertion of the same metallic insert or ferrule on said pin into the resilient washer or sleeve restrainably positioned at the discharge end of its guide chute. The partially assembled ferrule and sleeve will be moved by the rotating wheel and pin members into engagement with the camming sections of a pair of endless conveyors or chains which engage the resilient sleeve element for forcing same onto the metallic insert or ferrule subsequent to which the assembled sleeve and ferrule will be discharged from the conveying pin and rotating wheel.

Thus the apparatus of the present invention is adapted to have the endless chains or conveyors engage the resilient sleeve or washer element on diametrically opposite sides of the metallic insert or ferrule so as to impart a camming action to said resilient sleeve and through said camming action to direct a uniform application of force to the resilient element on opposite sides of the metallic insert or ferrule to insure the proper positioning of said resilient element or sleeve upon said metallic insert or ferrule. This arrangement will insure the proper positioning of the resilient sleeve or element upon the metallic insert or ferrule and the arrangement of the pins on the rotating wheel can be such that contemporaneous with the discharge of one assembled sleeve and ferrule that another sleeve and ferrule will be brought into engagement with one another and be moved into the camming area of said apparatus thereby causing a continuous flow of assembled elements from said rotating wheel.

BRIEF DESCRIPTION OF THE PREFERRED EMBODIMENT

Figure 2:
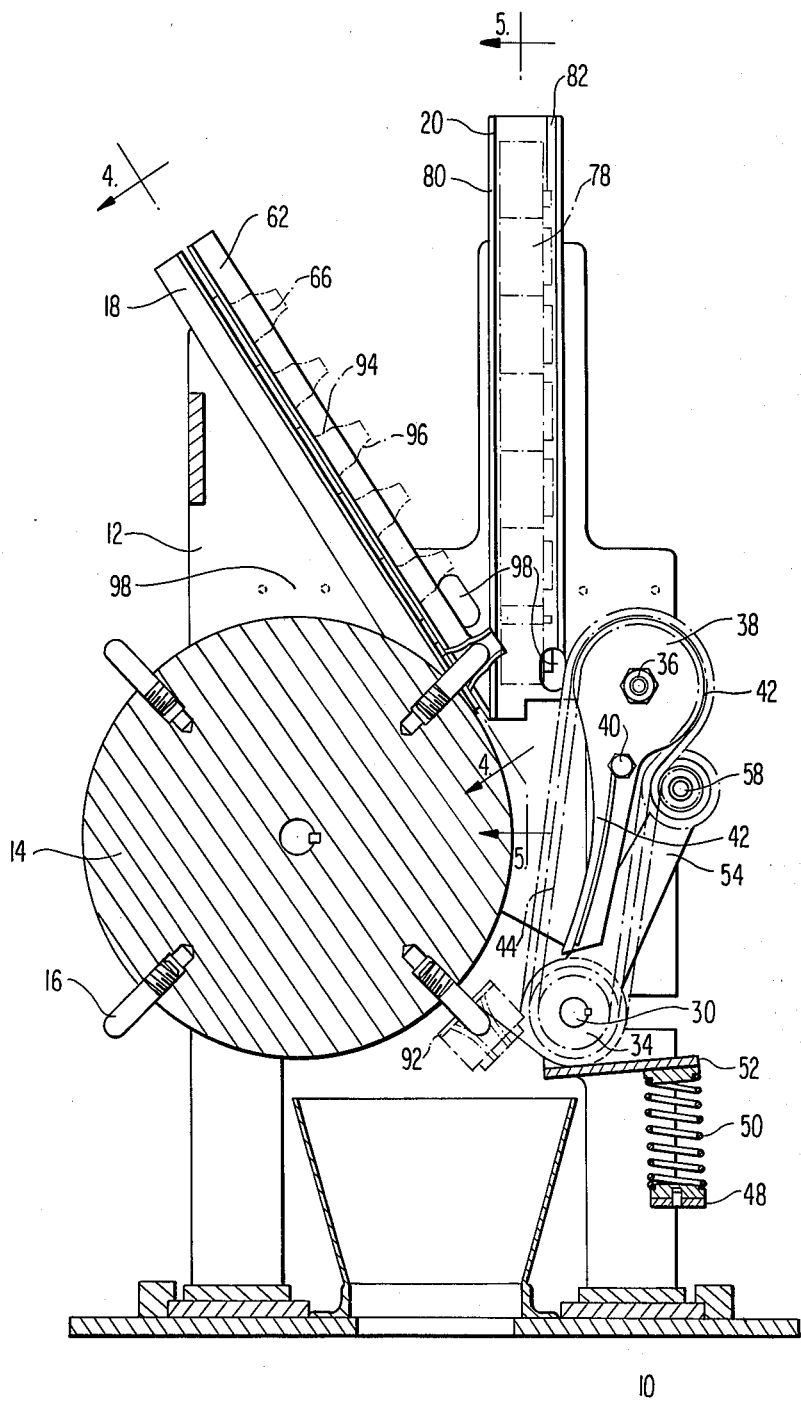
FIG. 2 is a vertical sectional view of the apparatus of the present invention, the view being taken on the line 2—2 of FIG. 1.

Referring to the drawings, there is shown in FIG. 2 a base member 10 having a vertically disposed back plate element 12 which has rotatably supported thereon a wheel 14 that is provided with a plurality of radially projecting pin elements 16. The back plate 12 has mounted thereon superjacent the wheel 14 a supply chute 18 the lower end of which terminates adjacent the periphery of the wheel 14. The back plate 12 also has mounted thereon a supply chute 20, the lower or discharge end of which is positioned adjacent the discharge end of the supply chute 18.

Figure 1:
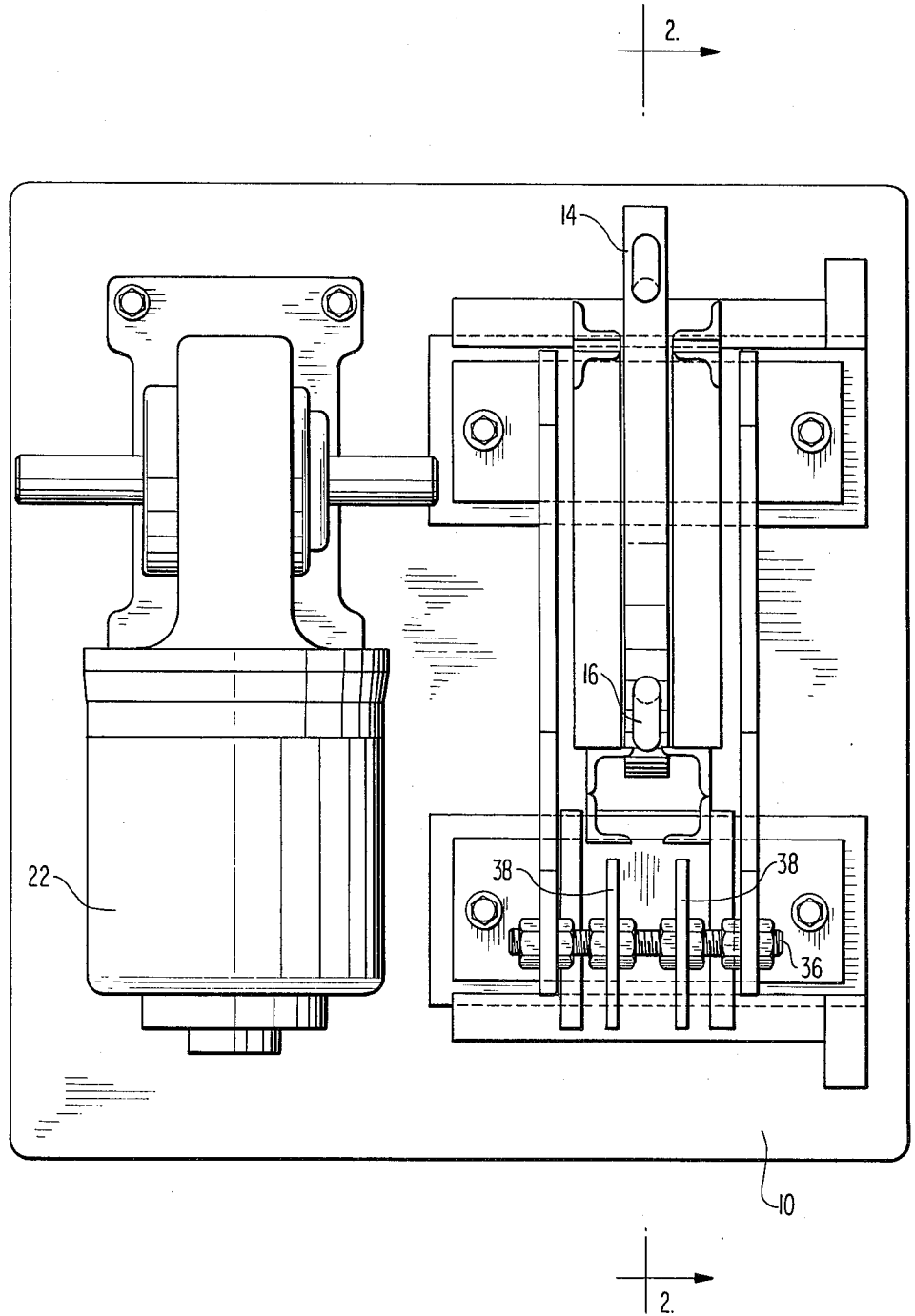
FIG. 1 is a plan view of an assembling apparatus embodying the present invention.
Figure 3:
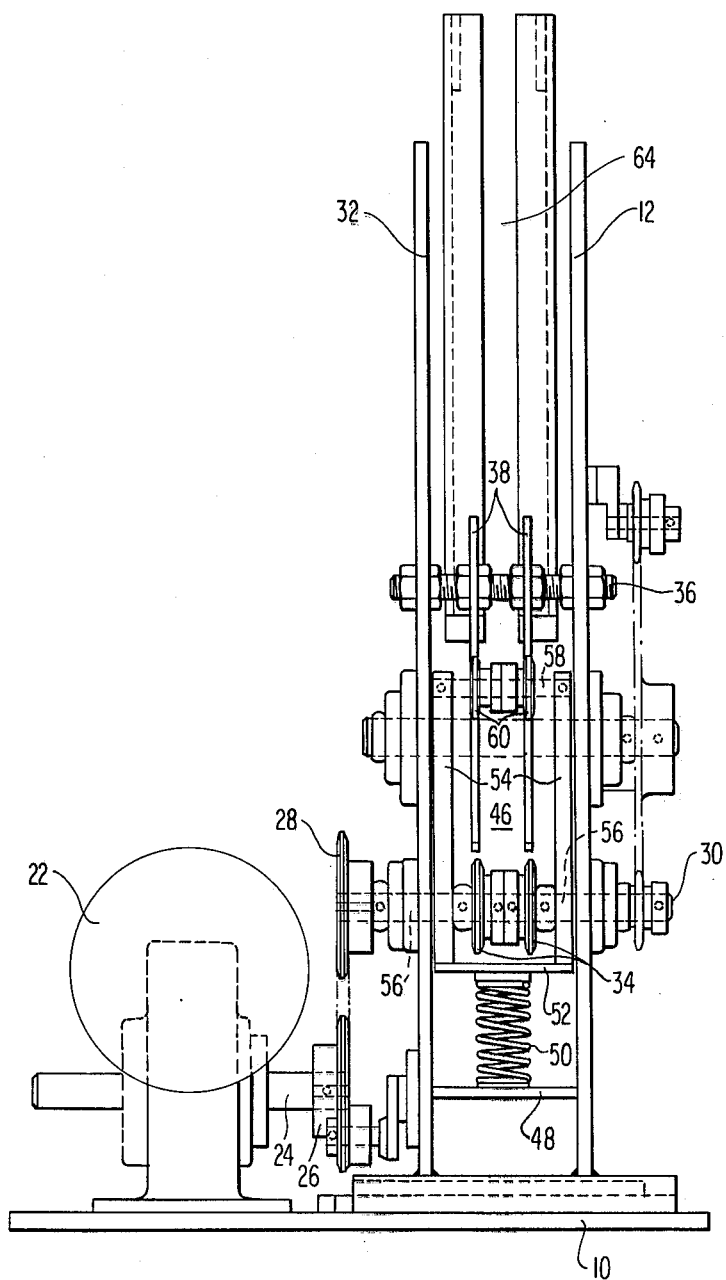
FIG. 3 is an end elevational view of the assembling apparatus shown in FIG. 2.

The base member 10, FIGS. 1 and 3, has mounted thereon a suitable drive motor 22 having a drive shaft 24 that is provided with a gear or gear sprocket 26 that is adapted to drive a gear 28 through a suitable sprocket chain, not shown. The gear 28 is mounted on a shaft 30 which is supported in the back plate 12 and a complimentary front plate 32 which is secured to the base member 10 in spaced parallel relation to the back plate 12. The shaft 30 has secured thereon, in spaced relation to one another, a pair of sprockets 34.

The back plate 12, FIGS. 2 and 3, has mounted therein, superjacent the sprockets 34, a supporting rod 36 which has secured thereto a cam plate 38 which is also provided with a second supporting rod 40 for holding said cam plate 38 in a fixed position. The cam plate 38 is formed with a smooth machined outer surface 42, which constitutes a cam track, that is adapted to receive and guide a sprocket chain 44 that is entrained about the sprocket 34 on the shaft 30.

The front plate element 32, FIG. 3, also has mounted thereon a cam plate 38 in the same manner as the cam plate 38 is mounted on the back plate 12. In addition, the cam plate carried by the front plate element 32 has a sprocket chain 44 entrained thereover so that each of the sprockets 34 carried on the shaft 30 has a sprocket chain 44 entrained thereover which chains move over the cam track surface 42 provided on the cam plates 38. In this manner the two cam plates 38 are maintained in spaced parallel relation to one another and in alignment with the sprocket gears 34 so as to define therebetween a passageway 46.

The rear and front plate elements 12 and 32, FIG. 3, have connected thereto, adjacent the base member 10, a support element 48 which has mounted thereon the lower end of a coil spring 50 with the upper end of said spring being anchored to a horizontal plate member 52 that is secured to the lower ends of a pair of spaced parallel arm elements 54. The lower ends of the arms 54 are provided with suitable bearing supports 56 for rotation about the shaft 30. The upper ends of the arms 54, FIGS. 2 and 3, have mounted therein a rod 58 which has rotatably positioned thereon a pair of spaced sprockets 60. The sprockets 60 are adapted to engage the sprocket chains 44 that are entrained about the sprockets 34 on the shaft 30 and which move about the cam track 42 in order to maintain said sprocket chains under tension and insure their retention on the cam track 42 and sprockets 34. This action is brought about by the spring 50 urging the plate 52 and arms 54 in a direction towards the chains 44 carried by said sprockets 34 and cam track 42.

The shaft 30 is provided with suitable driving means, not shown, which is connected to the wheel 14 for rotating same in timed relation to the travel of the sprocket chain 44 so that the peripheral speed of the wheel 14 and the speed of the sprocket chain 44 moving over the cam track 42 are such that they move in unison to one another.

Figure 4:
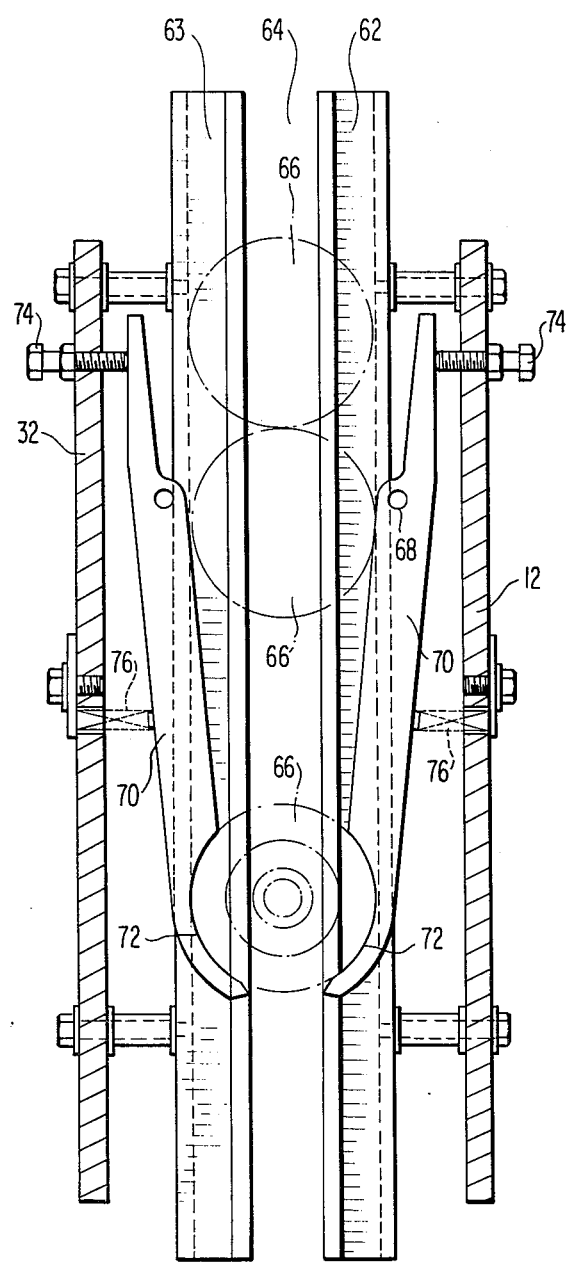
FIG. 4 is a detailed sectional view of a portion of the supply chute for the metal insert or ferrule, the view being taken on the line 4—4 of FIG. 2.

The supply chute 18, FIG. 4, consists of elongated angle members 62 that are connected to and carried by the back plate 12 while similar angle members 63 are connected to and carried by the front plate member 32. The angle members 62 and 63 are spaced from one another a distance to provide a slotted passageway 64 through which the metallic insert or ferrule 66 is adapted to move by gravity. The angle member 62 has positioned thereon by means of a pin 68 a retaining arm 70 that is provided at one end with an arcuate shaped segment 72. The rearmost portion of the arm 70 is engaged by a set screw 74 carried by the back plate 12. The retaining arm 70 is provided with a coil spring 76 that engages the back plate 12 and urges the arcuate segments 72 of said arm inwardly towards the passageway 64. The front plate member 32 is also provided with a retaining arm 70 arranged in the same manner as the retaining arm 70 is with respect to back plate 12.

Thus as the metallic insert or ferrule 66 moves through the passageway 64, under the action of gravity, the arcuate segments 72 of the retaining arms 70 will move inwardly towards said passageway a sufficient distance to engage the metallic insert or ferrule and retain same in said passageway. As a metallic insert or ferrule is withdrawn from said passageway under the action of the pin elements 16 carried by the wheel 14 the driving force of the wheel 14, will be such as to overcome the action of the spring 76 causing the segments 72 to move apart about the pivots 68 thereby permitting the first metallic insert or ferrule to be withdrawn from the passageway 64. As the first or leading metallic insert or ferrule is withdrawn from the discharge end of the passageway 64 the arcuate segments 72, under the action of the spring 76, will move inwardly towards the passageway 64 and engage the next succeeding metallic insert or ferrule and retain same in said passageway until said metallic insert or ferrule is engaged by a pin 16 on the wheel 14.

Figure 5:
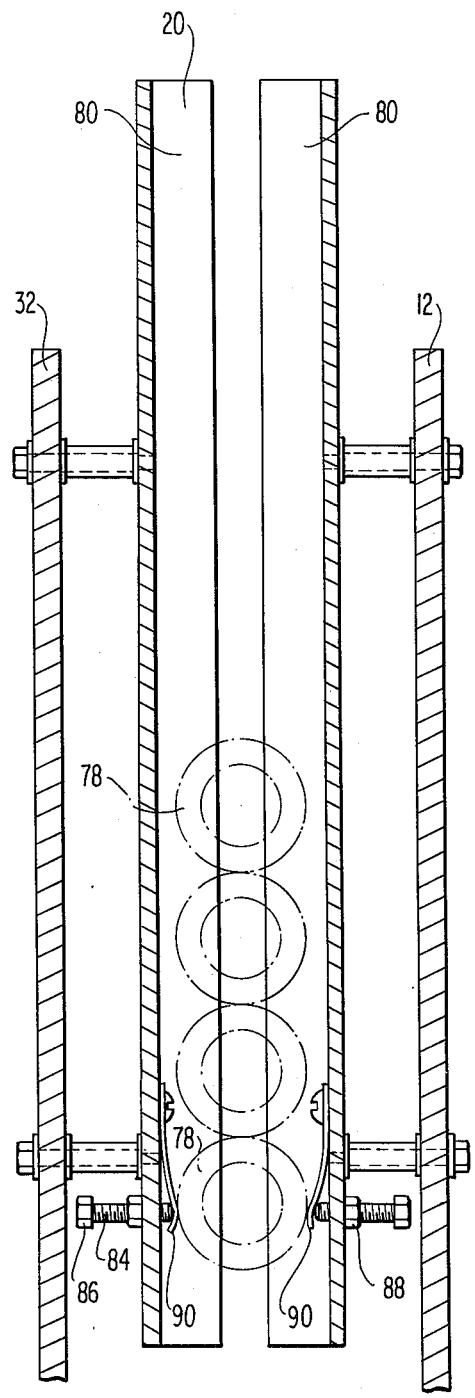
FIG. 5 is a detailed sectional view of a portion of the supply chute for the resilient washer or sleeve elements, the view being taken on the line 5—5 of FIG. 2.

The supply chute 20, FIG. 5, through which the resilient washer or sleeve elements 78 are adapted to move under the action of gravity is formed from a pair of front and back members 80 of channel configuration that are carried by the back and front plate members 12 and 32. The channel members 80, FIG. 2, are each provided adjacent their open upper ends with corner inserts 82 which insure the proper alignment and positioning of the resilient washer or sleeve element 78 as they are inserted into the guide chute 20. The lower or discharge end of the chute 20, FIG. 5, is provided with a pair of stock restraining and positioning members 84 that are carried by the rear and front plate members 12 and 32 and said stock restraining and positioning members 84 consist of pin elements 86 provided with lock nuts 88 for positioning said stock restraining and positioning members 84 in the chute elements 20. The stock restraining and positioning members 84 have their innermost ends projecting into the interior of the chute 20 where said ends engage spring elements 90 mounted therein which engage the resilient washers or elements 78 to retain same within the chute 20.

In the use of the present apparatus the metallic inserts or ferrules 66 and the resilient washer or sleeve element 78 may be of different shapes or configurations than that as shown, but for the purpose of illustration as set forth herein the metallic inserts or ferrules 66 have an annular base segment 92, FIG. 2, which is provided with a vertically extended tubular portion 94 that terminates in a reduced end or nipple segment 96. The metallic inserts or ferrules 66 are delivered to the upper end of the supply or guide chute 18 by any suitable means, not shown, and said metallic inserts or ferrules move through the passageway 64 of said chute 18 with the nipple segment 96 projecting from said chute in the manner as illustrated in FIG. 2. The resilient elements 78, FIG. 2, are delivered to the chute 20 by any suitable means, not shown, and same are inserted into the upper end thereof where they are properly aligned by means of the inserts 82 so that said resilient elements move from the top to the lower end of said chute under the action of gravity until they engage the spring elements 90, FIG. 5, provided at the lower end of said chute.

The supply chutes 18 and 20 being filled with their respective parts the wheel 14 is rotated under the action of the drive motor 22 through the shaft 30 causing said wheel to rotate in a clockwise direction, when viewing FIG. 2, so that a pin element 16 will move into the lowermost metallic element or ferrule 66 contained in the chute 18 in the manner as illustrated in FIG. 2. As the pin 16 moves into the metallic insert or ferrule 66 and withdraws same from between the arcuate segments 72 of the retaining arm 70 causing said arms to pivot about the pivot point 68 thereby permitting the withdrawal of the lowermost metallic insert or ferrule, the nipple 96 of the metallic insert or ferrule under the rotative movement of the wheel 14 will be directed into the aperture provided in the resilient washer or element 78. As the nipple portion 96 of the metallic insert or ferrule moves into the opening provided in the resilient washer or element 78 it will cause said resilient element to be drawn through the spring elements 90 provided at the lower end of the chute 20 enabling said resilient element to be moved out of the chute and into contact with the endless chains 44, FIG. 2, which move over the cam track 42.

The chain elements 44 are spaced from one another so as to engage the resilient element 78 on opposite sides of the nipple 96 which is moving through and projecting out of the resilient element under the action of the pin 16 and the rotation of the wheel 14. The continued movement of the metallic insert and resilient element under the action of the pin 16 will urge same against the chain element 44 causing said resilient element to be forced downwardly on the tubular portion 94 of the metallic insert 66 until said resilient element engages or bottoms against the annular base portion 92 of said metallic insert 66. As the chains 44 force the resilient elements onto the metallic insert 66 the continued rotation of the wheel 14 causes said resilient elements to be drawn along in synchronization with the surface of the chains 44 and due to the path of travel of said chains the distance between the chains and the wheel 14 is reduced resulting in a camming action of the chains with respect to the resilient elements as they are forced onto the metallic inserts or ferrules 66.

The camming action of the chains 44 is enhanced by the movement of the sprockets 60 under the action of the arms 54 and the spring 50 engaging the sprocket chains 44 and maintaining same in a taut condition. The movement of the metallic insert or ferrule 66 in conjunction with the resilient element 78 from the lower end of the chutes under the action of the pin 16 and wheel 14 and against the action of the rotative chains 44 results in the resilient elements being forced onto the metallic inserts or ferrules by a camming action which is created by the arcuate shape of the cam track 42 which progressively causes a reduction in the spacing between the periphery of the wheel 14 and the chains 44. The assembly of the metallic insert or ferrule 66 into a resilient sleeve or washer 78 involves the forceful fitting of two mating surfaces having a high coefficient of friction. The slipping of the outer surfaces of the tubular portion 94 and the nipple segment 96 of the metallic insert or ferrule 66 within the internal bore surface of the resilient element 78 requires a finite time element which is provided by the progressive camming action caused by the chains 44 and cam track 42. The distance between the periphery of the wheel 14 and the lower sprockets 44 is such that as the resilient element moves therebetween it is compressed to its greatest degree so that as said metallic insert 66 and resilient element 78 move beyond the sprockets 34 the assembled device will end to rebound or be projected off of the pins 16 due to the compression imparted to the resilient element where they may be deposited in a suitable receptacle.

The wheel 14 and the lower or discharge end of the chutes 18 and 20 are each provided with suitable sensing means 98 which are connected to a suitable control unit, not shown. The sensing elements 98 associated with chutes 18 and 20 are adapted to determine that if either the metallic insert 66 or the resilient element 78 is not in proper position at the lower end of either the chute 18 or 20 for engagement by the next pin 16 on the wheel 14 then the sensing element 98 associated with wheel 14, upon sensing the passage of the next pin 16, will signal said control unit to stop the rotation of the wheel 14 until such time as the metallic insert or resilient element reaches the lower end of its respective chute 18 or 20 for engagement by said pin 16.

Although the foregoing description is necessarily of a detailed character, in order that the invention may be completely set forth, it is to be understood that the specific terminology is not intended to be restrictive or confining, and that various rearrangements of parts and modifications of details may be resorted to without departing from the scope or spirit of the invention as herein claimed.

I claim:

1. An apparatus for assembling an insert with a sleeve member comprising a plate member having a rotatable member mounted thereon, a plate having a cam track thereon mounted on said plate member, supply chutes for said insert and said sleeve member mounted on said plate member with the discharge ends thereof positioned between said rotatable member and plate, driving means for said rotatable member, means on said rotatable member engagable with said supply chutes for removing therefrom said insert and sleeve member in partially assembled relation and moving said insert and sleeve member into engagement with said cam track for camming said sleeve member and insert together.

2. An apparatus as set forth in claim 1 wherein said rotatable member is a wheel and the means thereon are radially projecting pins for engaging said inserts and sleeve members.

3. An apparatus as set forth in claim 2 wherein a pair of spaced sprocket wheels are mounted on said plate member adjacent said wheel and a pair of spaced plates each having a cam track thereon are mounted on said plate member adjacent said wheel, chains entrained about said sprocket wheels and over said cam tracks for engaging said sleeve members for camming said sleeve members onto said inserts upon the continued rotation of said wheel.

4. An apparatus as set forth in claim 3 wherein said supply chutes are mounted on said plate member with the discharge ends thereof positioned between said wheel and chains on said cam tracks with the discharge end of the chute for said insert being adjacent the periphery of said wheel.

5. An apparatus as set forth in claim 4 wherein said sprocket wheels are positioned on a shaft carried by said plate member, a pair of spaced arms pivotally mounted on said shaft, sprockets mounted on the ends of said arms and engagable with said chains and spring biasing means engaging said arms for urging said sprockets into engagement with said chains to maintain said chains under tension.

6. An apparatus as set forth in claim 5 wherein said wheel and supply chutes and cam plates with chains are mounted on said plate member in a common plane spaced from the plane of said plate member with the discharge end of the chute for said sleeve member being positioned adjacent said chains and cam plates, a pin on said wheel engagable with an insert at the discharge end of said chute for withdrawing said insert upon the rotation of said wheel, said withdrawn insert movable into said sleeve member by said pin upon the continued rotation of said wheel for withdrawing said sleeve member upon said insert and pin from the discharge end of said supply chute, said chains engaging said sleeve member for camming said sleeve member onto said insert.

7. An apparatus as set forth in claim 6 wherein sensing means are provided adjacent said wheel and adjacent the discharge ends of said chutes to control the driving means for said wheel.

8. An apparatus as set forth in claim 6 wherein said insert is formed with an annular base with a tubular portion projecting therefrom in a plane normal thereto, said tubular portion terminating in a nipple segment that moves between the chains on said cam tracks with said chains engaging said sleeve member on opposite sides of said tubular portion for camming said sleeve onto said tubular portion and against said annular base.

9. An apparatus as set forth in claim 8 wherein said wheel and pins move said insert and sleeve member against and along the chains on said cam track with the spacing between said chains and wheel decreasing from the discharge ends of said chutes to said sprocket wheels with the spacing between said sprocket wheels and said wheel being the smallest to insure the compressing of the sleeve members onto said inserts with said insert and sleeve being propelled off of said pin as said wheel and pin moves past said sprocket wheels.

10. An apparatus as set forth in claim 8 wherein the supply chute for said insert includes a pair of angle members secured to a back plate member and a front plate member in spaced relation to one another to define a passageway through which said insert moves, said angle members having a retaining arm pivotally mounted thereon, a set screw carried by the plate members and engagable with an end of said retaining arm for positioning same with respect to said passageway, a coil spring interposed between each plate member and an arm, each arm terminating in an arcuate shaped segment for engaging said inserts and retaining them in said passageway.

11. An apparatus as set forth in claim 8 wherein the supply chute for said sleeve member includes a pair of spaced angle members secured to a back plate member and a front plate member, said angle members having inserts provided therein to orient the sleeve members being inserted therein, said angle members having pin elements mounted therein adjacent the discharge end of said supply chute with spring elements on said pins to engage and retain said sleeve members within said angle members.

* * * * *